United States Patent [19]
Coates, Jr. et al.

[11] 3,878,189
[45] Apr. 15, 1975

[54] AZO DYE COMPOUNDS FROM AMINO-1,2-BENZISOTHIAZOLON-1,1-DIOXIDES

[75] Inventors: Clarence A. Coates, Jr.; Max A. Weaver, both of Kingsport, Tenn.

[73] Assignee: Eastman Kodak Company, Rochester, N.Y.

[22] Filed: July 2, 1973

[21] Appl. No.: 376,094

[52] U.S. Cl............... 260/155; 8/41 C; 260/154; 260/156; 260/158; 260/301; 260/304; 260/516; 260/544 M
[51] Int. Cl........................ C09b 29/36; D06p 3/54
[58] Field of Search ............ 260/158, 155, 156, 154

[56] References Cited
UNITED STATES PATENTS

| | | | |
|---|---|---|---|
| 2,785,157 | 3/1957 | Straley et al. | 260/158 |
| 3,084,153 | 4/1963 | Fishwick et al. | 260/158 |
| 3,161,632 | 12/1964 | Straley et al. | 260/158 |
| 3,213,081 | 10/1965 | Straley et al. | 260/155 |
| 3,491,082 | 1/1970 | Weaver et al. | 260/158 |
| 3,632,565 | 1/1972 | Angliker et al. | 260/158 |
| 3,776,898 | 12/1973 | Stanley et al. | 260/158 |

FOREIGN PATENTS OR APPLICATIONS

| | | | |
|---|---|---|---|
| 1,102,435 | 2/1968 | United Kingdom | 260/158 |
| 1,120,279 | 7/1968 | United Kingdom | 260/158 |
| 468,443 | 3/1969 | Switzerland | 260/158 |

Primary Examiner—Floyd D. Higel
Assistant Examiner—C. F. Warren

[57] ABSTRACT

Disperse azo dye compounds having the formula

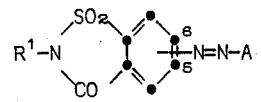

wherein $R^1$ is hydrogen or an organic radical having a molecular weight of not more than 200; A is an aniline, 1,2,3,4-tetrahydroquinoline or benzomorpholine disperse azo dye coupling component, and the 1,2-benzisothiazolon-1,1-dioxide group is bonded to the azo group at the 5- or 6-position; produce bright orange to red shades on polyester and cellulose acetate fibers and exhibit good to excellent dyeability and fastness properties.

10 Claims, No Drawings

AZO DYE COMPOUNDS FROM AMINO-1,2-BENZISOTHIAZOLON-1,1-DIOXIDES

This invention relates to certain novel disperse dye azo compounds and the use thereof and, more particularly, to azo compounds containing a 1,2-benzisothiazolon-1,1-dioxide diazo component and to polyester and cellulose acetate fibers dyed therewith.

Our novel azo compounds have the general formula (I) 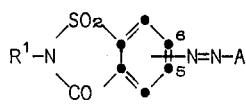

wherein $R^1$ is hydrogen or an organic radical having a molecular weight of not more than 200, A is an aniline, 1,2,3,4-tetrahydroquinoline or benzomorpholine disperse azo dye coupling component, and the 1,2-benzisothiazolon-1,1-dioxide group is bonded to the azo group at the 5- or 6-position.

The disperse dye azo compounds of the invention produce bright scarlet to red shades on polyester and cellulose acetate fibers on which the compounds exhibit good fastness and dyeability properties. Our azo compounds, in general, exhibit good to excellent fastness to light, washing and sublimation. The fastness to sublimation and dyeability properties of our novel compounds will vary moderately depending on the particular coupling component A of formula (I). Our compounds also exhibit good to excellent stability over a pH range of 4 to 8 when applied to texturized polyester fibers at elevated pressures at 250° to 265°F. The good dyeability properties of our compounds render them fast to crocking and result in good build-up and barre coverage.

The disperse azo dye coupling components represented by A are characterized by being devoid of ionic substituents, such as carboxylate, sulfonate and ammonium groups capable of rendering our novel azo compound completely water soluble when present in aqueous dyebath in concentrations commonly used in disperse dyeing techniques. The coupling components of our novel compounds are described extensively in the literature, including the following patents:

| U.S. 2,249,749 | U.S. 3,161,632 | U.S. 3,359,256 |
| U.S. 2,249,774 | U.S. 3,206,452 | U.S. 2,891,942 |
| U.S. 2,251,947 | U.S. 3,336,285 | U.S. 3,268,507 |
| U.S. 2,286,795 | U.S. 3,349,075 | U.S. 2,967,858 |
| U.S. 2,309,129 | U.S. 3,370,055 | U.S. 2,971,953 |
| U.S. 2,436,100 | U.S. 3,379,711 | U.S. 3,117,956 |
| U.S. 2,683,708 | U.S. 3,380,990 | U.S. 3,122,410 |
| U.S. 2,683,709 | U.S. 3,386,988 | U.S. 3,178,405 |
| U.S. 2,726,237 | U.S. 3,423,394 | U.S. 3,206,454 |
| U.S. 2,773,054 | U.S. 3,424,741 | U.S. 3,329,669 |
| U.S. 2,785,157 | U.S. 3,429,871 | U.S. 3,342,800 |
| U.S. 2,805,218 | U.S. 3,442,886 | U.S. 3,398,135 |
| U.S. 3,148,180 | U.S. 2,092,398 | U.S. 3,406,165 |
|  |  | U.S. 3,407,189 |

Such couplers are bonded to the azo group by an aromatic ring carbon atom in the position para to the nitrogen atom of the coupler nucleus, i.e., the 6-position of the tetrahydroquinoline and the 7-position of the benzomorpholine coupling components.

Typical of the coupling components represented by A are those having the formulas

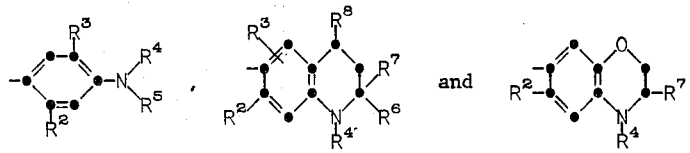

wherein $R^2$ is hydrogen, lower alkyl, lower alkoxy, halogen or a group having the formula -NH-acyl;

$R^3$ is hydrogen, lower alkyl or lower alkoxy;

$R^4$ individually is alkyl containing one to about eight carbon atoms; cyclohexyl; cyclohexyl substituted with lower alkyl; or lower alkyl substituted with lower alkoxy, aryl, aryloxy, cyclohexyl, cyano, lower alkanoyloxy, lower alkoxycarbonyl, lower alkoxycarbonyloxy, aroyloxy, lower alkylcarbamoyloxy, arylcarbamoyloxy, or a group having the formula

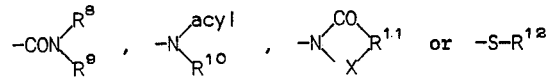

wherein $R^8$ individually is hydrogen, lower alkyl or aryl;

$R^9$ individually is hydrogen or lower alkyl;

$R^8$ and $R^9$ collectively are $-(CH_2)_5-$ or $-CH_2CH_2OCH_2CH_2-$;

$R^{10}$ is hydrogen, lower alkyl, aryl, or cyclohexyl;

$R^{11}$ is ethylene, propylene, trimethylene, o-cyclohexylene, or o-arylene, or when X is $-CO-$, $R^{11}$ also can be $-NHCH_2-$, $-N(\text{lower alkyl})CH_2-$, $-SCH_2-$, $-OCH_2-$, or $-CH_2OCH_2-$;

X is $-CH_2-$, $-CO-$, or $-SO_2-$; and $R^{12}$ is aryl, benzyl, cyclohexyl, 1,2,4-triazol-3-yl, or 2-benzothiazolyl;

$R^5$ individually is hydrogen; lower alkyl; lower alkyl substituted with lower alkoxy, aryl, aryloxy, cyclohexyl, lower alkanoyloxy, lower alkoxycarbonyl or lower alkoxycarbonyloxy; allyl; or aryl;

$R^4$ and $R^5$ in combination is a group having the formula $-CH_2CH_2-Y-CH_2-CH_2-$ in which Y is $-CH_2-$, $-O-$, $-S-$, $-SO-$ or $-SO_2-$, $\rangle N-acyl.$ $R^6$ is methyl or, when $R^7$ and $R^8$ each is hydrogen, $R^6$ can be lower alkyl; and $R^7$ and $R^8$ each is hydrogen or methyl.

The couplers which can be used in preparing our novel azo compounds can be obtained by published procedures or techniques analogous thereto. The substituents encompassed by the generic terminology set forth above are well-known in the art of azo dyes. As used herein to describe a substituent containing an alkyl moiety, "lower" designates a carbon content of one to about four carbon atoms.

Each aryl moiety of the aryl- and arylene-containing groups, e.g., aroyloxy, phthalimido, arylthio, etc., which our compounds can contain preferably is phenyl, phenylene, and phenyl and phenylene substituted with lower alkyl, lower alkoxy, lower alkoxycarbonyl or halogen such as a chlorine or bromine atom.

The organic acyl radicals represented by "acyl" preferably are formyl, lower alkanoyl, aroyl, cyclohexoyl, lower alkoxycarbonyl, aryloxycarbonyl, lower alkylsulfonyl, cyclohexylsulfonyl, arylsulfonyl, carbamoyl, lower alkylcarbamoyl, arylcarbamoyl, furoyl, etc. The alkanoyl groups can be substituted with substituents such as halogen, aryl, cyano, lower alkoxy, aryloxy, benzyloxy, lower alkylthio, lower alkylsulfonyl, etc. The alkylsulfonyl groups also can be substituted, for example, with cyano, hydroxy, halogen and the like. The alkoxycarbonyl groups can be substituted, for example, with hydroxy, alkoxy and cyano. Acetyl, propionyl, butyryl, cyanoacetyl, chloroacetyl, trifluoroacetyl, phenylacetyl, methoxyacetyl, methylthioacetyl, methylsulfonylacetyl, methoxycarbonyl, propoxycarbonyl, butoxycarbonyl, methylsulfonyl, ethylsulfonyl, propylsulfonyl, butylsulfonyl, 2-cyanoethylsulfonyl, 2-hydroxyethylsulfonyl, and 2-chloroethylsulfonyl, are examples of the alkanoyl, alkoxycarbonyl and alkylsulfonyl groups which "acyl" can represent. Dimethylcarbamoyl, ethylcarbamoyl, propylcarbamoyl, butylcarbamoyl, phenylcarbamoyl and dimethylcarbamoyl are examples of the substituted carbamoyl groups. The unsubstituted and substituted alkanoyl, aroyl and alkoxycarbonyl groups are preferred.

The substituted alkyl groups represented by $R^4$ preferably are arylmethyl, arylethyl, cyclohexylmethyl, 2-cyanoethyl, or a group having the formula $-Z-R_{13}$ in which Z is ethylene, propylene, trimethylene, or tetramethylene and $R^{13}$ is any of the substituents, except aryl, cyano, and cyclohexyl, which can be present on the substituted alkyl groups represented by $R^4$ as defined above. Similarly, the preferred substituted alkyl groups represented by $R^5$ are arylmethyl, arylethyl, cyclohexylmethyl or a group having the formula $-Z-R^{14}$ in which Z is defined above and $R^{14}$ is any of the substituents, except aryl and cyclohexyl, which can be present on the substituted alkyl groups which $R^3$ can represent according to the above definitions thereof. It is also preferred that only one of $R^3$ and $R^5$ is alkyl.

A group of our compounds which are especially preferred are those having the formulas

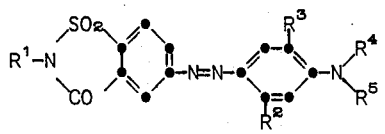

and

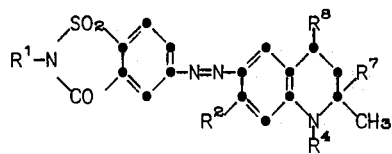

5-Amino wherein $R^1$ is lower alkyl; arylmethyl; cyclohexylmethyl; 2-cyanoethyl; 2-carbamoylethyl; aryl; cyclohexyl; or the group $-Z-R^{15}$ in which Z is ethylene, propylene, or trimethylene and $R^{15}$ is succinimido, glutarimido, phthalimido, hydroxy, lower alkanoyloxy, 2-pyrrolidinone, or lower alkoxy;

$R^2$ is hydrogen, methyl, lower alkanoylamino, benzamido or lower alkoxycarbonylamino;

$R^3$ is hydrogen or when $R^5$ is hydrogen, $R^3$ is methyl;

$R^4$ is lower alkyl; allyl; cyclohexyl; arylmethyl; cyclohexyl-methyl; 2-cyanoethyl; 2-carbamoylethyl; N-lower alkyl-2-carbamoylethyl; N,N-di-lower alkyl-2-carbomoylethyl; or the group $-Z-R^{16}$ in which Z is ethylene, propylene or trimethylene and $R^{16}$ is hydroxy, lower alkanoyloxy, lower alkoxycarbonyl, lower alkoxycarbonyloxy, succinimido, glutarimido, phthalimido, aroyloxy, lower alkoxy or the group

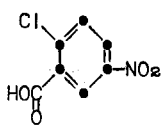

$R^5$ is hydrogen; lower alkyl; cyclohexyl; arylmethyl; cyclohexylmethyl; or the group $-Z-R^{17}$ in which Z is ethylene, propylene or trimethylene and $R^{17}$ is lower alkanoyloxy, lower alkoxycarbonyl or lower alkoxycarbonyloxy; and $R^7$ and $R^8$ each is hydrogen or methyl;

in which each aryl moiety is phenyl, tolyl, anisyl, ethoxyphenyl or chlorophenyl. When $R^4$ and $R^5$ both represent substituents conforming to the formulas $-Z-R^{16}$ and $-Z-R^{17}$ the Z groups preferably are the same.

The azo compounds of our invention are synthesized by diazotizing a 5- or 6-amino-1,2-benzisothiazolon-1,1-dioxide and coupling the resulting diazonium salt with an aniline, tetrahydroquinoline or benzomorpholine disperse azo dye coupler having the formula H-A. The diazo precursors are obtained according to the techniques described in Farmaco Ed. Sci., 19(3), 254–68 (1964); C.A. 61, 3088 and Farmaco Ed. Sci., 18(10), 732–49 (1963); C.A. 60, 2919. The following reaction sequence summarizes the synthesis of the amino-1,2-benzisothiazolon-1,1-dioxides:

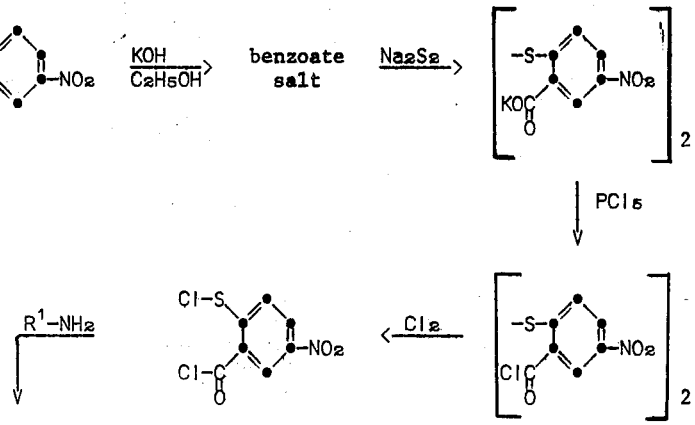

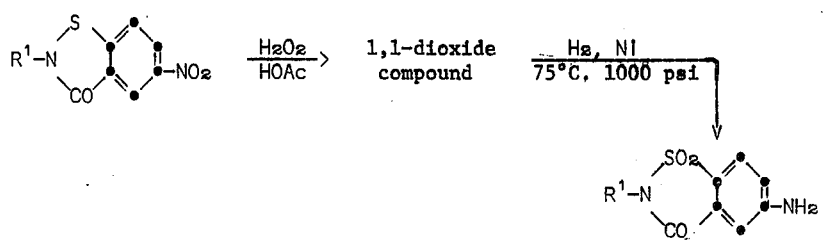

6-Amino

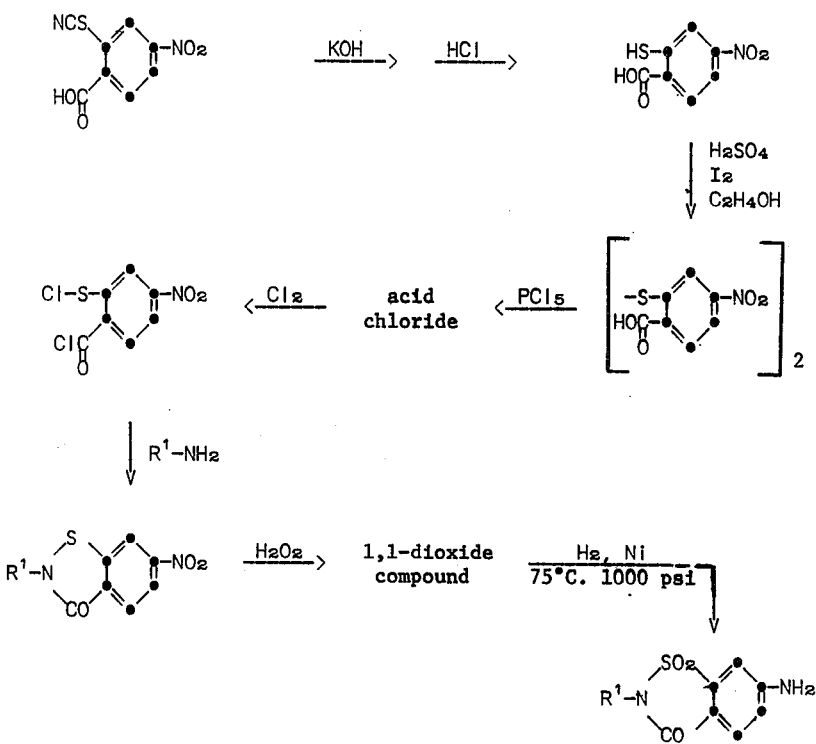

The compounds in which $R^1$ is a substituent also can be obtained by using ammonia as the amine to yield a compound in which $R^1$ is hydrogen and then alkylating the nitro-1,2-benzisothiazolon-1,1-dioxide compound with an alkylating agent such as an aliphatic halide. The particular substituent represented by $R^1$ is, in general, not critical. However, since our novel azo compounds are disperse dye compounds, substituent $R^1$ is free of water-solubilizing groups such as sulfonate and carboxylate salt groups. The primary amines from which substituent $R^1$ can be derived have the formula $R-NH_2$ in which $R^1$ is an unsubstituted or substituted aliphatic, alicyclic, aromatic or heterocyclic residue having a molecular weight of not more than 200. In view of the vast number of primary amines and aliphatic halides which are known and/or can be synthesized by conventional procedures and since the substituent represented by $R^1$ is not critical, no further elaboration on the groups represented by $R^1$ is warranted. However, it is preferred that substituent $R^1$ be devoid of amino groups, including unsubstituted and substituted amino groups, since such groups can affect detrimentally the synthesis of the azo compounds. The substituents described above in the definition of $R^4$ are typical of the groups which $R^1$ can represent.

Our novel azo compounds, their synthesis and their use are further illustrated by the following examples.

EXAMPLES 1-4

Sodium nitrite (0.94 g.) is added gradually to 7 ml. of conc. $H_2SO_4$. The solution is cooled and 1:5 acid (1 part by volume propionic acid to 5 parts by volume acetic acid) (15 ml.) is added below 15°C. To this mixture is added 5-amino-N-ethyl-1,2-benzisothiazolon-1,1-dioxide (2.94 g., 0.013 mole), followed by 15 ml. of 1:5 acid, all below 5°C. The reaction mixture is stirred at 0°–5°C. for 2 hr. The following couplers (0.0033 mole) are dissolved in 25 ml. of 1:5 acid:

N,N-Diethyl-m-acetamidoaniline (Example 1)
N-Benzyl-N-ethyl-m-acetamidoaniline (Example 2)
N-β-Cyanoethyl-N-ethyl-m-toluidine (Example 3)
N-β-Acetoxyethyl-N-ethyl-m-acetamidoaniline (Example 4)

To each chilled coupler solution is added a 0.0033 mole aliquot of diazonium salt solution. The coupling mixtures are buffered by the addition of ammonium acetate and allowed to stand for 1 hr. The azo compound products are precipitated by the addition of water, collected by filtration, washed with water and dried in air. If needed, the azo products are purified by slurrying in hot methanol, cooling, filtering and washing with methanol.

Examples 5-12

According to the procedure described above, 4.5 g. of 5-amino-N-ethyl-1,2-benzisothiazolon-1,1-dioxide is diazotized by adding it to a mixture of 1.44 g. sodium nitrite, 10 ml. conc. sulfuric acid and 20 ml. 1:5 acid followed by the addition of 20 ml. 1:5 acid. A 0.0025 aliquot of the diazonium solution is added to a solution of the following couplers as described above:

N-β-Acetoxyethyl-N-cyclohexyl-m-acetamidoaniline (Example 5)

N-Cyclohexylmethyl-N-ethyl-m-acetamidoaniline (Example 6)

N-Cyclohexyl-N-ethyl-m-acetamidoaniline (Example 7)

N-β-Hydroxyethyl-2,2,4,7-tetramethyl-1,2,3,4-tetrahydroquinoline (Example 8)

N-β-Acetamidoethyl-N-ethyl-m-toluidine (Example 9)

7-Acetamido-N-ethyl-2,2,4-trimethyl-1,2,3,4-tetrahydroquinoline (Example 10)

N-(3-ethylcarbamoylaminopropyl-2,2,4,7-tetramethyl-1,2,3,4-(tetrahydroquinoline (Example 11)

N-β-Hydroxyethyl-3,6-dimethylbenzomorpholine (Example 12)

The couplers of Examples 5,6,7,9,10 and 11 were dissolved in 20 cc. of 1:5 acid and those of Examples 8 and 12 were dissolved in 20 cc. of 15% sulfuric acid. The azo compounds are isolated and purified as described above.

The azo compounds set forth in Tables I, II and III are prepared according to the synthesis techniques described herein and conform to the formulas:

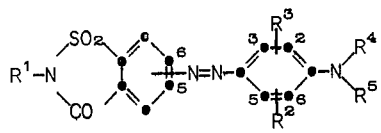

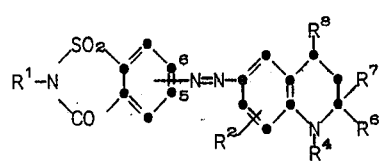

and

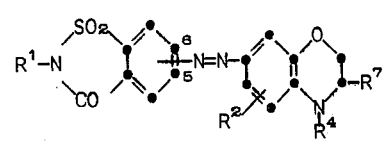

respectively. Examples 1 through 12 appearing in the Tables identify the structures of the azo compounds prepared in the preceding examples. The diazo component of the Compounds of Examples 1–7, 9, 13–139, 8, 10, 11–236, 12 and 276–295 is bonded to the azo groups at the 5-position and the diazo component of the compounds of Examples 140–201, 237–275 and 296–312 is bonded to the azo group at the 6-position. The color given for each azo compound is the shade the compound produces on polyester fibers.

TABLE I

| Example No. | $R^1$ | $R^2$, $R^3$ | $R^4$ | $R^5$ | Color |
|---|---|---|---|---|---|
| 1 | —$C_2H_5$ | 3—NHCOCH$_3$ | —$C_2H_5$ | —$C_2H_5$ | Scarlet |
| 2 | —$C_2H_5$ | 3—NHCOCH$_3$ | —CH$_2C_6H_5$ | —$C_2H_5$ | Scarlet |
| 3 | —$C_2H_5$ | 3—CH$_3$ | —CH$_2$CH$_2$CN | —$C_2H_5$ | Orange |
| 4 | —$C_2H_5$ | 3—NHCOCH$_3$ | —CH$_2$CH$_2$OOCCH$_3$ | —$C_2H_5$ | Scarlet |
| 5 | —$C_2H_5$ | 3—NHCOCH$_3$ | —$C_6H_{11}$ | —CH$_2$CH$_2$OOCCH$_3$ | Scarlet |
| 6 | —$C_2H_5$ | 3—NHCOCH$_3$ | —CH$_2C_6H_{11}$ | —$C_2H_5$ | Scarlet |
| 7 | —$C_2H_5$ | 3—NHCOCH$_3$ | —$C_6H_{11}$ | —$C_2H_5$ | Scarlet |
| 9 | —$C_2H_5$ | 3—CH$_3$ | —CH$_2$CH$_2$OOCCH$_3$ | —$C_2H_5$ | Scarlet |
| 13 | —$C_2H_5$ | 3—NHCOCH$_3$ | —CH$_2$CH$_2$OOCCH$_3$ | —CH$_2$CH$_2$OOCCH$_3$ | Orange |
| 14 | —$C_2H_5$ | 3—NHCOCH$_3$ | —CH$_2$CH$_2$NCOCH$_2$CH$_2$CO | —$C_2H_5$ | Scarlet |
| 15 | H | 3—NHCOCH$_3$ | —$C_2H_5$ | —CH$_2$CH$_2$CH$_3$ | Scarlet |
| 16 | H | 3—NHCOCH$_3$ | —$C_2H_5$ | —CH$_2$CH$_2$OOCCH$_3$ | Scarlet |
| 17 | —(CH$_2$)$_3$CH$_3$ | 3—NHCOCH$_3$ | —$C_2H_5$ | —CH$_2$CH$_2$OOCCH$_3$ | Scarlet |
| 18 | —(CH$_2$)$_3$CH$_3$ | 3—NHCOCH$_3$ | —$C_2H_5$ | —$C_2H_5$ | Scarlet |
| 19 | —(CH$_2$)$_3$CH$_3$ | 3—NHCOCH$_3$ | —$C_2H_5$ | —CH$_2C_6H_5$ | Scarlet |
| 20 | —(CH$_2$)$_3$CH$_3$ | 3—NHCOCH$_3$ | —CH$_2$CH$_2$S—C=NNHCH=N | —$C_2H_5$ | Scarlet |
| 21 | —CH$_2C_6H_5$ | 3—NHCOCH$_3$ | —$C_2H_5$ | —CH$_2$CH$_2$OOCCH$_3$ | Scarlet |
| 22 | —$C_2H_5$ | H | —$C_2H_5$ | —$C_2H_5$ | Orange |
| 23 | —$C_2H_5$ | H | —$C_2H_5$ | —CH$_2$CH$_2$CH$_3$ | Orange |
| 24 | —$C_2H_5$ | H | —CH$_2$CH$_2$OOCCH$_3$ | —CH$_2$CH$_2$OOCCH$_3$ | Orange |
| 25 | —CH$_2C_6H_5$ | 3—NHCOCH$_3$ | —CH$_2$CH$_2$OOCCH$_3$ | —CH$_2$CH$_2$OOCCH$_3$ | Orange |
| 26 | —$C_2H_5$ | H | —CH$_2$CH$_2$CN | —CH$_2$CH$_2$OOCCH$_3$ | Orange |
| 27 | —$C_2H_5$ | 3—NHCOCH$_3$ | —$C_2H_5$ | —CH$_2$CH(CH$_3$)OOCCH$_3$ | Scarlet |
| 28 | —$C_2H_5$ | 3—NHCOCH$_3$ | —CH$_2$CH$_2$CONH$_2$ | —$C_2H_5$ | Scarlet |
| 29 | —$C_2H_5$ | 3—NHCOCH$_3$ | —$C_2H_5$ | —CH$_2$CH=CH$_2$ | Scarlet |
| 30 | —$C_2H_5$ | 3—NHCOCH$_3$ | —CH$_2$CH$_2$NHCOCH$_3$ | —$C_2H_5$ | Scarlet |
| 31 | —$C_2H_5$ | 3—NHCOCH$_3$ | —CH$_2$CH$_2$NHCOC$_6H_5$ | —$C_2H_5$ | Scarlet |
| 32 | —$C_2H_5$ | 3—NHCOCH$_3$ | —CH$_2$CH$_2$NHCOOC$_2H_5$ | —$C_2H_5$ | Scarlet |
| 33 | —$C_2H_5$ | 3—NHCOCH$_3$ | —CH$_2C_6H_5$ | —CH$_2$CH$_2$OOCCH$_3$ | Scarlet |
| 34 | —$C_2H_5$ | 3—NHCOCH$_3$ | —CH$_2C_6H_{11}$ | —CH$_2$CH$_2$OOCCH$_3$ | Scarlet |
| 35 | —$C_2H_5$ | 2—CH$_3$—5—NHCOCH$_3$ | —$C_2H_5$ | H | Scarlet |
| 36 | —$C_2H_5$ | 2—CH$_3$—5—NHCOCH$_3$ | —CH(CH$_3$)C$_2H_5$ | H | Scarlet |
| 37 | —$C_2H_5$ | 2—CH$_3$—5—NHCOCH$_3$ | —$C_6H_{11}$ | H | Scarlet |
| 38 | —$C_2H_5$ | 2—CH$_3$—5—NHCOCH$_3$ | —CH$_2C_6H_5$ | H | Scarlet |
| 39 | —$C_2H_5$ | 2—CH$_3$—5—NHCOCH | —CH$_2$CH$_2$CN | H | Orange |
| 40 | —$C_2H_5$ | 2—CH$_3$—5—NHCOCH$_3$ | —CH$_2$CH$_2$OOCCH$_3$ | H | Orange |
| 41 | —CH$_2C_6H_{11}$ | 3—NHCOCH$_3$ | —$C_2H_5$ | —CH$_2$CH$_2$OOCCH$_3$ | Scarlet |

TABLE I — Continued

| Example No. | R¹ | R², R³ | R⁴ | R⁵ | Color |
|---|---|---|---|---|---|
| 42 | —CH₃ | 3—CH₃ | —CH₂CH₂CN | —CH₂CH₂OOCCH₃ | Orange |
| 43 | —CH₂CH(CH₃)₂ | H | —CH₂CH₂CN | —CH₂CH₂OOCCH₃ | Orange |
| 44 | —CH₂C₆H₁₁ | 3—NHCOCH₃ | —C₂H₅ | —CH₂CH₂CH₃ | Scarlet |
| 45 | —C₆H₁₁ | 3—NHCOCH₃ | —C₂H₅ | —CH₂CH₂CH₃ | Scarlet |
| 46 | —C₆H₁₁ | 3—NHCOCH₃ | —C₂H₅ | —CH₂CH₂OOCCH₃ | Scarlet |
| 47 | —C₆H₅ | 3—NHCOCH₃ | —C₂H₅ | —CH₂CH₂OOCCH₃ | Scarlet |
| 48 | —C₆H₅ | 3—NHCOCH₃ | —C₆H₁₁ | —CH₂CH₂OOCCH₃ | Red |
| 49 | —C₆H₅ | 3—NHCOCH₃ | —CH₂C₆H₁₁ | —C₂H₅ | Scarlet |
| 50 | —(CH₂)₃OCH₃ | 3—NHCOCH₃ | —C₂H₅ | —C₂H₅ | Scarlet |
| 51 | —(CH₂)₃OCH₃ | 3—NHCOCH₃ | —CH₂CH₂NCOCH₂CH₂CO | —C₂H₅ | Scarlet |
| 52 | —CH₂CH₂OOCCH₃ | 3—NHCOCH₃ | —C₂H₅ | —C₂H₅ | Scarlet |
| 53 | —CH₂CH₂OOCCH₃ | 3—NHCOCH₃ | —C₆H₁₁ | —CH₂CH₂CH₃ | Scarlet |
| 54 | —CH₂CH₂OH | 3—NHCOCH₃ | —C₂H₅ | —CH₂CH₂CH₃ | Scarlet |
| 55 | —CH₂CH₂N(CH₂)₃CO | 3—NHCOCH₃ | —C₂H₅ | —CH₂CH₂CH₃ | Scarlet |
| 56 | —CH₂CH₂N(CH₂)₃CO | 3—NHCOCH₃ | —C₆H₁₁ | —C₂H₅ | Scarlet |
| 57 | —CH₂CH₂NHCOCH₃ | 3—NHCOCH₃ | —C₂H₅ | —CH₂CH₂CH₃ | Scarlet |
| 58 | —CH₂C₆H₄—p—OCH₃ | 3—NHCOCH₃ | —C₂H₅ | —CH₂CH₂OOCCH₃ | Scarlet |
| 59 | —CH₂C₆H₅ | 3—NHCOCH₃ | —C₂H₅ | —CH₂CH₂OOCCH₃ | Scarlet |
| 60 | —CH₂CH₂CONH₂ | 3—NHCOCH₃ | —C₂H₅ | —CH₂CH₂OOCCH₃ | Scarlet |
| 61 | —C₂H₅ | 2—OCH₃—5—NHCOCH₃ | —CH₂CH₂OOCCH₃ | —CH₂CH₂OOCCH₃ | Red |
| 62 | —C₂H₅ | 2—OCH₃—5—CH₃ | —CH₂CH₂OOCCH₃ | —CH₂CH₂OOCCH₃ | Red |
| 63 | —C₂H₅ | 2,5—di—OCH₃ | —CH₂CH₂OOCCH₃ | —CH₂CH₂OOCCH₃ | Red |
| 64 | —C₂H₅ | 2—CH₃—5—OCH₃ | —CH₂CH₂OOCCH₃ | —CH₂CH₂OOCCH₃ | Red |
| 65 | —CH₂CH₂CN | 3—NHCOCH₃ | —C₂H₅ | —CH₂CH₂OOCCH₃ | Scarlet |
| 66 | —CH₂CH₂NCOCH₂CH₂CO | 3—NHCOCH₃ | —C₂H₅ | —C₂H₅ | Scarlet |
| 67 | —CH₂CH₂Cl | 3—NHCOCH₃ | —C₂H₅ | —C₂H₅ | Scarlet |
| 68 | —CH₂CH₂SO₂C₆H₅ | 3—NHCOCH₃ | —C₂H₅ | —C₂H₅ | Scarlet |
| 69 | —CH₂CH₂NHSO₂CH₃ | 3—NHCOCH₃ | —C₂H₅ | —C₂H₅ | Scarlet |
| 70 | —CH₂CH₂N(CH₃)SO₂CH₃ | 3—NHCOCH₃ | —C₂H₅ | —C₂H₅ | Scarlet |
| 71 | —CHCH₂SO₂CH₂CH₂ | 3—NHCOCH₃ | —C₂H₅ | —C₂H₅ | Scarlet |
| 72 | —CHCH₂SO₂CH₂CH₂ | 3—NHCOC₂H₅ | —C₂H₅ | —CH₂CH₂OOCCH₃ | Scarlet |
| 73 | —C₆H₄—m—CH₃ | 3—NHCOC₂H₅ | —C₂H₅ | —CH₂CH₂OOCCH₃ | Scarlet |
| 74 | —C₆H₄—m—Cl | 3—NHCOC₂H₅ | —C₂H₅ | —CH₂CH₂OOCCH₃ | Scarlet |
| 75 | —C₆H₄—p—OCH₃ | 3—NHCOC₂H₅ | —C₂H₅ | —CH₂CH₂OOCCH₃ | Scarlet |
| 76 | —CH₂CH₂COOCH₃ | 3—NHCOC₂H₅ | —C₂H₅ | —CH₂CH₂OOCCH₃ | Scarlet |
| 77 | —CH₂CH₂NCO-o-C₆H₄CO | 3—NHCOC₂H₅ | —C₂H₅ | —C₂H₅ | Scarlet |
| 78 | —CH₂CH₂NCO-o-C₆H₄SO₂ | 3—NHCOC₂H₅ | —C₂H₅ | —C₂H₅ | Scarlet |
| 79 | —CH₂CH₂OOCC₆H₅ | 3—NHCOC₂H₅ | —C₂H₅ | —C₂H₅ | Scarlet |
| 80 | —CH₂CH₂OOCOC₂H₅ | 3—NHCOC₂H₅ | —C₂H₅ | —C₂H₅ | Scarlet |
| 81 | —CH₂CH₂OCH₂CH₂OH | 3—NHCOC₂H₅ | —C₂H₅ | —C₂H₅ | Scarlet |
| 82 | —CH₂CH₂NCH₂-o-C₆H₄CO | 3—NHCOC₂H₅ | —C₂H₅ | —C₂H₅ | Scarlet |
| 83 | —CH₂CH₂NCOCH₂HNCO | 3—NHCOC₂H₅ | —C₂H₅ | —C₂H₅ | Scarlet |
| 84 | —CH₂CH₂NCOCH₂OCH₂CO | 3—NHCOC₂H₅ | —C₂H₅ | —C₂H₅ | Scarlet |
| 85 | —CH₂CH₂OC₆H₅ | 3—NHCOC₂H₅ | —C₂H₅ | —C₂H₅ | Scarlet |
| 86 | —CH₂—C₆H₄—p—COOCH₃ | 3—NHCOC₂H₅ | —C₂H₅ | —C₂H₅ | Scarlet |
| 87 | —CH₂CH=CH₂ | 3— NHCOC₂H₅ | —C₂H₅ | —C₂H₅ | Scarlet |
| 88 | —CH(CH₃)C₂H₅ | 3—NHCOC₂H₅ | —C₂H₅ | —C₂H₅ | Scarlet |
| 89 | —CH₂COC₆H₅ | 3—NHCOC₂H₅ | —C₂H₅ | —C₂H₅ | Scarlet |
| 90 | —C₆H₄—p—SO₂CH₃ | 3—NHCOC₂H₅ | —C₂H₅ | —C₂H₅ | Scarlet |
| 91 | —C₆H₄—p—NHCOCH₃ | 3—NHCOC₂H₅ | —C₂H₅ | —C₂H₅ | Scarlet |
| 92 | —CH₂C₆H₁₀—p—CH₂OH | 3—NHCOC₂H₅ | —C₂H₅ | —C₂H₅ | Scarlet |
| 93 | —C₂H₅ | 3—NHCOOC₂H₅ | —C₂H₅ | —C₂H₅ | Scarlet |
| 94 | —C₂H₅ | 3—NHCOOC₂H₅ | —CH₂C₆H₅ | —CH₂C₆H₅ | Scarlet |
| 95 | —C₂H₅ | 3—NHCOC₆H₅ | —C₂H₅ | —C₂H₅ | Scarlet |
| 96 | —C₂H₅ | 3—NHCOC₆H₅ | —C₂H₅ | —CH₂CH₂OOCCH₃ | Scarlet |
| 97 | —C₂H₅ | 3—NHCOC₆H₁₁ | —C₂H₅ | —CH₂CH₂OOCCH₃ | Scarlet |
| 98 | —C₂H₅ | 2—CH₃—5—NHCOC₆H₅ | H | —CH₂(CH₃)C₂H₅ | Scarlet |
| 99 | —C₂H₅ | 3—NHCOCH₂OH | —C₂H₅ | —C₂H₅ | Scarlet |
| 100 | —C₂H₅ | 3—NHCOCH₂Cl | —C₂H₅ | —C₂H₅ | Scarlet |
| 101 | —C₂H₅ | 3—NHCOCH₂OCH₃ | —C₂H₅ | —C₂H₅ | Red |
| 102 | —C₂H₅ | 3—NHCOCH₂CH₂Cl | —C₂H₅ | —C₂H₅ | Scarlet |
| 103 | —C₂H₅ | 3—NHCOCH₂OC₆H₅ | —C₂H₅ | —C₂H₅ | Scarlet |
| 104 | —C₂H₅ | 3—NHCOCH₂C₆H₅ | —C₂H₅ | —C₂H₅ | Scarlet |
| 105 | —C₂H₅ | 3—NHSO₂CH₃ | —C₂H₅ | —C₂H₅ | Scarlet |
| 106 | —C₂H₅ | 3—NHCOCH₂CH₂CN | —C₂H₅ | —C₂H₅ | Scarlet |
| 107 | —C₂H₅ | 3—NHCONHC₂H₅ | —C₂H₅ | —C₂H₅ | Scarlet |
| 108 | —C₂H₅ | 3—NHCONHC₆H₅ | —C₂H₅ | —C₂H₅ | Scarlet |
| 109 | —C₂H₅ | 3—NHCOCH₂OOCCH₃ | —C₂H₅ | —C₂H₅ | Scarlet |
| 110 | —C₂H₅ | 3—NHCOCH₃ | —CH₂CH₂NCO-o-C₆H₄CO | —C₂H₅ | Scarlet |
| 111 | —C₂H₅ | H | —CH₂CH₂NCO-o-C₆H₄CO | —C₂H₅ | Orange |
| 112 | —C₂H₅ | 3—NHCOCH₃ | —CH₂CH₂NCOCH₂NHCO | —C₂H₅ | Scarlet |
| 113 | —C₂H₅ | 3—CH₃ | —CH₂CH₂NCOCH₂NHCO | —C₂H₅ | Scarlet |
| 114 | —C₂H₅ | 3—NHCOCH₃ | —CH₂CH₂N(CH₃)SO₂CH₃ | —C₂H₅ | Scarlet |
| 115 | —C₂H₅ | 3—NHCOCH₃ | —CH₂CH₂N(C₂H₅)SO₂C₆H₅ | —C₂H₅ | Scarlet |
| 116 | —C₂H₅ | 3—NHCOCH₃ | —CH₂CH₂NCO-o-C₆H₄SO₂ | —C₂H₅ | Scarlet |
| 117 | —C₂H₅ | 3—NHCOCH₃ | —CH₂CH₂NH(C₆H₅)SO₂CH₃ | —C₂H₅ | Scarlet |
| 118 | —C₂H₅ | 3—NHCOCH₃ | —CH₂CH₂—SO₂—CH₂CH₂— | | Orange |
| 119 | —C₂H₅ | 3—NHCOCH₃ | —CH₂CH₂OCH₂CH₂— | | Scarlet |
| 120 | —C₂H₅ | 3—NHCOCH₃ | —(CH₂)₅— | | Scarlet |
| 121 | —C₂H₅ | 3—NHCOCH₃ | —CH₂CH₂N(SO₂CH₃)CH₂CH₂— | | Scarlet |
| 122 | —C₂H₅ | 3—NHCOCH₃ | —CH₂—C₆H₄—p—COOCH₃ | —C₂H₅ | Scarlet |
| 123 | —C₂H₅ | 3—NHCOCH₃ | —CH₂CH(OOCH₃)CH₂OOCH₃ | —C₂H₅ | Scarlet |

TABLE I—Continued

| Example No. | $R^1$ | $R^2, R^3$ | $R^4$ | $R^5$ | Color |
|---|---|---|---|---|---|
| 124 | $-C_2H_5$ | 3—NHCOCH$_3$ | $-CH_2CH(OOCH_3)CH_2Cl$ | $-C_2H_5$ | Scarlet |
| 125 | $-C_2H_5$ | 3—NHCOCH$_3$ | $-CH_2CH_2OC_2H_5$ | $-C_2H_5$ | Scarlet |
| 126 | $-C_2H_5$ | 3—NHCOCH$_3$ | $-CH_2CH_2OOCC_6H_5$ | $-C_2H_5$ | Scarlet |
| 127 | $-C_2H_5$ | 3—NHCOCH$_3$ | $-CH_2CH_2OOCCH_2OC_6H_5$ | $-C_2H_5$ | Scarlet |
| 128 | $-C_2H_5$ | 3—NHCOCH$_3$ | $-CH_2CH_2OOCCH_2C_6H_5$ | $-C_2H_5$ | Scarlet |
| 129 | $-C_2H_5$ | 3—NHCOCH$_3$ | $-CH_2CH_2OOCCH_2COCH_3$ | $-C_2H_5$ | Scarlet |
| 130 | $-C_2H_5$ | 3—NHCOCH$_3$ | $-CH_2CH_2OOCCH_2CN$ | $-C_2H_5$ | Scarlet |
| 131 | $-C_2H_5$ | 3—NHCOCH$_3$ | $-CH_2CH_2OOCCH_2CH_2OCH_3$ | $-C_2H_5$ | Scarlet |
| 132 | $-C_2H_5$ | 3—NHCOCH$_3$ | $-CH_2CH_2OOCCH_2CH_2COOC_2H_5$ | $-C_2H_5$ | Scarlet |
| 133 | $-C_2H_5$ | 3—NHCOCH$_3$ | $-CH_2C_6H_5$ | $-CH_2C_6H_4-p-COOCH_3$ | Scarlet |
| 134 | $-C_2H_5$ | 3—NHCOCH$_3$ | $-CH_2C_6H_{11}$ | $-CH_2C_6H_4-p-COOCH_3$ | Scarlet |
| 135 | $-C_2H_5$ | 3—NHCOCH$_3$ | $-CH_2C_6H_5$ | $-C_6H_{11}$ | Scarlet |
| 136 | $-C_2H_5$ | 3—NHCOCH$_3$ | $-CH_2C_6H_{11}$ | $-CH_2C_6H_{11}$ | Red |
| 137 | $-C_2H_5$ | 3—NHCOCH$_3$ | $-CH_2C_6H_{11}$ | $-CH_2CH_2CONHCH(CH_3)_2$ | Red |
| 138 | $-C_2H_5$ | 3—NHCOCH$_3$ | $-C_6H_{11}$ | $-CH_2CH_2OOCOC_2H_5$ | Red |
| 139 | $-C_2H_5$ | 3—NHCOCH$_3$ | $-C_6H_{11}$ | $-CH_2CH_2CN$ | Red |
| 140 | $-C_2H_5$ | 3—NHNHCOCH$_3$ | $-C_2H_5$ | $-CH_2CH_2CH_3$ | Scarlet |
| 141 | $-C_2H_5$ | 3—NHCOCH$_3$ | $-C_6H_{11}$ | $-C_2H_5$ | Scarlet |
| 142 | $-C_2H_5$ | 3—NHCOCH$_3$ | $-CH_2C_6H_5$ | $-C_2H_5$ | Scarlet |
| 143 | $-C_2H_5$ | 3—NHCOCH$_3$ | $-CH_2CH_2OOCCH_3$ | $-C_2H_5$ | Scarlet |
| 144 | $-C_2H_5$ | 3—CH$_3$ | $-CH_2CH_2OOCCH_3$ | $-C_2H_5$ | Scarlet |
| 145 | $-C_2H_5$ | 3—NHCOCH$_3$ | $-CH_2CH_2\overline{NCO(CH_2)_3CO}$ | $-C_2H_5$ | Scarlet |
| 146 | $-C_2H_5$ | 3—CH$_3$ | $-CH_2CH_2\overline{NCO(CH_2)_3CO}$ | $-C_2H_5$ | Scarlet |
| 147 | $-C_2H_5$ | 3—NHCOCH$_3$ | $-CH_2CH_2OOCCH_3$ | $-CH_2CH_2OOCCH_3$ | Scarlet |
| 148 | $-C_2H_5$ | H | $-CH_2CH_2OOCCH_3$ | $-CH_2CH_2OOCCH_3$ | Scarlet |
| 149 | $-C_2H_5$ | 3—NHCOCH$_3$ | $-CH_2CH(C_2H_5)(CH_2)_3CH_3$ | $-C_2H_5$ | Scarlet |
| 150 | $-C_2H_5$ | 3—NHCOCH$_3$ | $-CH_2CH_2NHCOCH_3$ | $-C_2H_5$ | Scarlet |
| 151 | $-C_2H_5$ | 2—CH$_3$—5—NHCOCH$_3$ | $-C_2H_5$ | H | Scarlet |
| 152 | $-C_2H_5$ | 2—CH$_3$—5—NHCOCH$_3$ | $-CH_2C_6H_5$ | H | Scarlet |
| 153 | $-C_2H_5$ | 2—CH$_3$—5—NHCOCH$_3$ | $-C_6H_{11}$ | H | Scarlet |
| 154 | $-C_2H_5$ | 3—NHCOCH$_3$ | $-CH_2CH_2OOCC_6H_5$ | $-(CH_2)_3CH_3$ | Scarlet |
| 155 | $-C_2H_5$ | 3—NHCOCH$_3$ | $-CH_2CH_2OOCOC_2H_5$ | $-CH_2CH(CH_3)_2$ | Scarlet |
| 156 | $-C_2H_5$ | 3—NHCOCH$_3$ | $-C_6H_{11}$ | $-CH_2CH(OOCCH_3)CH_3$ | Scarlet |
| 157 | $-C_2H_5$ | 3—NHCOCH$_3$ | $-C_6H_{11}$ | $-CH_2C_6H_5$ | Scarlet |
| 158 | $-C_2H_5$ | 3—NHCOCH$_3$ | $-CH_2CH(OOCCH_3)CH_2OOCCH_3$ | $-C_2H_5$ | Scarlet |
| 159 | $-C_2H_5$ | 2—CH$_3$—5—NHCOC$_6H_5$ | $-CH(CH_3)C_2H_5$ | H | Scarlet |
| 160 | $-C_2H_5$ | 3—NHCOC$_2H_5$ | $-CH_2CH(CH_3)_2$ | $-CH_2CH_2CH_3$ | Scarlet |
| 161 | $-C_2H_5$ | 3—NHCOC$_2H_5$ | $-CH_2C_6H_4-p-COOCH_3$ | $-CH_2CH_2CH_3$ | Scarlet |
| 162 | $-C_2H_5$ | 3—NHCOC$_2H_5$ | $-CH_2C_6H_{11}$ | $-CH_2CH_2OOCCH_3$ | Scarlet |
| 163 | $-C_2H_5$ | 3—NHCOC$_2H_5$ | $-CH_2CH_2CN$ | $-C_2H_5$ | Scarlet |
| 164 | $-C_2H_5$ | 3—NHCOC$_2H_5$ | $-CH_2CH_2CONH_2$ | $-C_2H_5$ | Scarlet |
| 165 | $-C_2H_5$ | 3—NHCOC$_2H_5$ | $-CH_2CH_2CONHCH(CH_3)_2$ | $-C_2H_5$ | Scarlet |
| 166 | $-C_2H_5$ | 3—NHCOC$_2H_5$ | $-CH_2CH_2OC_6H_5$ | $-C_2H_5$ | Scarlet |
| 167 | $-CH(CH_3)_2$ | 3—NHCOCH(CH$_3$)$_2$ | $-C_2H_5$ | $-C_2H_5$ | Scarlet |
| 168 | $-(CH_2)_3CH_3$ | 3—NHCOOC$_2H_5$ | $-C_2H_5$ | $-C_2H_5$ | Scarlet |
| 169 | $-CH_2C_6H_5$ | 3—NHCOCH$_3$ | $-C_2H_5$ | $-C_2H_5$ | Scarlet |
| 170 | $-C_6H_{11}$ | 3—NHCOCH$_3$ | $-C_2H_5$ | $-C_2H_5$ | Scarlet |
| 171 | $-(CH_2)_3OCH_3$ | 3—NHCOCH$_3$ | $-C_2H_5$ | $-C_2H_5$ | Scarlet |
| 172 | $-CH_2CH_2OH$ | 3—NHCOCH$_3$ | $-C_2H_5$ | $-C_2H_5$ | Scarlet |
| 173 | $-CH_2CH_2OOCCH_3$ | 3—NHCOCH$_3$ | $-C_2H_5$ | $-C_2H_5$ | Scarlet |
| 174 | $-CH_2CH_2\overline{NCOCH_2CH_2CO}$ | 3—NHCOCH$_3$ | $-C_2H_5$ | $-C_2H_5$ | Scarlet |
| 175 | $-CH_2C_2C_6H_4-p-COOCH_3$ | 3—NHCOCH$_3$ | $-C_2H_5$ | $-C_2H_5$ | Scarlet |
| 176 | H | 3—NHCOCH$_3$ | $-C_2H_5$ | $-C_2H_5$ | Scarlet |
| 177 | $-\overline{CHCH_2SO_2CH_2CH_2}$ | 3—NHCOCH$_3$ | $-C_2H_5$ | $-C_2H_5$ | Scarlet |
| 178 | $-CH_2CH=CH_2$ | 3—NHCOCH$_3$ | $-C_2H_5$ | $-C_2H_5$ | Scarlet |
| 179 | $-CH_2CH(C_2H_5)(CH_2)_3CH_3$ | 3—NHCOCH$_2$OH | $-C_2H_5$ | $-C_2H_5$ | Scarlet |
| 180 | $-CH_2CH_2CH_3$ | 3—NHCOC$_6H_5$ | $-C_2H_5$ | $-C_2H_5$ | Scarlet |
| 181 | $-CH_2CH(CH_3)_2$ | 3—NHCOC$_6H_{11}$ | $-C_2H_5$ | $-C_2H_5$ | Scarlet |
| 182 | $-CH_2CH(CH_3)_2$ | 3—NHCOCH$_2$OC$_6H_5$ | $-C_2H_5$ | $-C_2H_5$ | Scarlet |
| 183 | $-CH_2CH(CH_3)_2$ | 3—NHCOC$_6H_4-p-COOCH_3$ | $-C_2H_5$ | $-C_2H_5$ | Scarlet |
| 184 | $-CH_2CH(CH_3)_2$ | 3—NHSO$_2$CH$_3$ | $-C_2H_5$ | $-C_2H_5$ | Scarlet |
| 185 | $-CH_2CH(CH_3)_2$ | 3—NHCONHC$_2H_5$ | $-C_2H_5$ | $-C_2H_5$ | Scarlet |
| 186 | $-CH_2C_6H_4-p-Cl$ | 3—NHCOOC$_2H_5$ | $-C_2H_5$ | $-C_2H_5$ | Scarlet |
| 187 | $-C_6H_4-p-OCH_3$ | 3—NHCOCH$_2$OH | $-C_2H_5$ | $-C_2H_5$ | Scarlet |
| 188 | $-C_6H_4-m-CH_3$ | 3—NHCOCH$_2$Cl | $-C_2H_5$ | $-C_2H_5$ | Scarlet |
| 189 | $-C_6H_4-p-NHCOCH_3$ | 3—NHCOCH$_3$ | $-C_2H_5$ | $-C_2H_5$ | Scarlet |
| 190 | $-C_2H_5$ | 3—NHCOCH$_3$ | $-CH_2CH_2CN$ | $-(CH_2)_3OOCCH_3$ | Orange |
| 191 | $-C_2H_5$ | H | $-CH_2CH_2CN$ | $-(CH_2)_3OOCCH_3$ | Orange |
| 192 | $-C_2H_5$ | 3—NHCOCH$_3$ | $-CH_2CH_2OOCCH_3$ | $-CH_2CH_2OOCCH_3$ | Orange |
| 193 | $-C_2H_5$ | 3—CH$_3$ | $-CH_2CH_2OOCCH_3$ | $-CH_2CH_2OOCCH_3$ | Orange |
| 194 | $-C_2H_5$ | 3—NHCOCH$_3$ | $-CH_2CH_2SO_2CH_2CH_2-$ | | Orange |
| 195 | $-C_2H_5$ | 3—NHCOCH$_3$ | $-CH_2CH_2OCH_2CH_2-$ | | Orange |
| 196 | $-C_2H_5$ | 3—NHCOCH$_3$ | $-CH_2CH(OOCCH_3)CH_2Cl$ | $-C_2H_5$ | Orange |
| 197 | $-C_2H_5$ | 3—NHCOCH$_3$ | $-CH_2CH_2C_6H_5$ | $-C_2H_5$ | Scarlet |
| 198 | $-C_2H_5$ | 3—NHCOCH$_3$ | $-CH_2C_6H_5$ | $-C_2H_5$ | Scarlet |
| 199 | $-C_2H_5$ | 3—NHCOCH$_3$ | $-CH_2C_6H_5$ | $-CH_2C_6H_5$ | Scarlet |
| 200 | $-C_2H_5$ | 3—NHCOCH$_3$ | $-CH_2C_6H_{11}$ | $-CH_2C_6H_5$ | Scarlet |
| 201 | $-C_2H_5$ | 3—NHCOCH$_3$ | $-CH_2C_6H_{10}-p-CH_3$ | $-CH_2CH_2CH_3$ | Scarlet |

TABLE II

| Example No. | R¹ | R², R⁶, R⁷, R⁸ | R⁴ | Color |
|---|---|---|---|---|
| 8 | —C₂H₅ | 2,2,4,7—tetra—CH₃ | —CH₂CH₂OH | Scarlet |
| 10 | —C₂H₅ | 2,2,4—tri—CH₃—7—NHCOCH₃ | —C₂H₅ | Red |
| 11 | —C₂H₅ | 2,2,4,7—tetra—CH₃ | —(CH₂)₃NHCONHC₂H₅ | Scarlet |
| 202 | —C₂H₅ | 2,2,4,7—tetra—CH₃ | —CH₂CH₂CONH₂ | Scarlet |
| 203 | —C₂H₅ | 2,2,4,7—tetra—CH₃ | —(CH₂)₃NHCOCH₃ | Scarlet |
| 204 | —C₂H₅ | 2,2,4,7—tetra—CH₃ | —CH₂CH₂Cl | Scarlet |
| 205 | —CH₂CH₂OCH₃ | 2,2,4,7—tetra—CH₃ | —(CH₂)₃NHCOCH₃ | Scarlet |
| 206 | —CH₂CH₂OCH₃ | 2,2,4,7—tetra—CH₃ | —CH₂CH₂CONH₂ | Scarlet |
| 207 | —C₂H₅ | 2,2,4,7—tetra—CH₃ | —CH₂CH₂SC=NNHCH=N | Scarlet |
| 208 | —C₂H₅ | 2,2,4,7—tetra—CH₃ | —C₂H₅ | Scarlet |
| 209 | —C₂H₅ | 2,2,4,7—tetra—CH₃ | —CH₂CH₂CN | Scarlet |
| 210 | —CH₂CH₂OH | 2,2,4,7—tetra—CH₃ | —C₂H₅ | Scarlet |
| 211 | —CH₂CH₂N(CH₂)₃CO | 2,7—di—CH₃ | —CH₂CH₂CONH₂ | Scarlet |
| 212 | —CH₂CH₂CONH₂ | 2,7—di—CH₃ | —C₂H₅ | Scarlet |
| 213 | —CH₂CH₂CH₃ | 2,7—di—CH₃ | —CH₂CH₂NHCOCH₃ | Scarlet |
| 214 | —C₆H₁₁ | 2,2,4,7—tetra—CH₃ | —CH₂CH₂OH | Scarlet |
| 215 | —CH₂C₆H₅ | 2,2,4,7—tetra—CH₃ | —CH₂CH(OH)CH₃ | Scarlet |
| 216 | —(CH₂)₃CH₃ | 2,2,4—tri—CH₃ | —CH₂CH₂CONH₂ | Orange |
| 217 | —(CH₂)₃CH₃ | 2,2,4—tri—CH₃—7—Cl | | Orange |
| 218 | —(CH₂)₃CH₃ | 2,2,4—tri—CH₃—5,8—di—OCH₃ | —CH₂CH₂OH | Red |
| 219 | —(CH₂)₃CH₃ | 2,2,4—tri—CH₃—5,8—di—CH₃ | —CH₂CH₂CN | Scarlet |
| 220 | —(CH₂)₃CH₃ | 2,2,4,7—tetra—CH₃ | —CH₂CH₂OOCCH₃ | Scarlet |
| 221 | —(CH₂)₃CH₃ | 2,2,4—tri—CH₃—7—NHCOCH₃ | —CH₂CH₂OOCCH₃ | Red |
| 222 | —(CH₂)₃CH₃ | 2,2,4—tri—CH₃—7—NHCOCH₃ | —C₂H₅ | Red |
| 223 | —(CH₂)₃CH₃ | 2,2,4—tri—CH₃—7—NHCOOC₂H₅ | —CH₂C₆H₅ | Red |
| 224 | —(CH₂)₃CH₃ | 2,2,4—tri—CH₃—7—NHCOCH₂OH | —C₂H₅ | Red |
| 225 | —(CH₂)₃CH₃ | 2,2,4—tri—CH₃—7—NHCOCH₂Cl | —C₂H₅ | Red |
| 226 | —C₂H₅ | 2,2,4—tri—CH₃ | —(CH₂)₃CH₃ | Orange |
| 227 | —C₂H₅ | 2,2,4,7—tetra—CH₃ | —CH₂CH₂N(CH₂CH₂OH)-SO₂CH₃ | Scarlet |
| 228 | —C₂H₅ | 2,2,4—tri—CH₃—7—NHCOC₂H₅ | —CH₂CH₂OOCCH₃ | Red |
| 229 | —C₂H₅ | 2—CH₃—7—NHCOCH₃ | —CH₂CH₂OOCCH₂CH(CH₃)₂ | Red |
| 230 | —C₂H₅ | 2,2,4—tri—CH₃—7—NHCOCH₃ | —CH₂CH₂OOCOC₂H₅ | Red |
| 231 | —C₂H₅ | 2,2,4—tri—CH₃—7—NHCOCH₃ | —CH₂CH₂C₆H₅ | Red |
| 232 | —CH₂CH₂OOCCH₃ | 2,2,4—tri—CH₃—7—NHCOCH₃ | —C₂H₅ | Red |
| 233 | —CH₂C₆H₅ | 2,2,4—tri—CH₃—7—NHCOCH₃ | —C₂H₅ | Red |
| 234 | —CH₂CH₂NHCOCH₃ | 2,2,4—tri—CH₃—7—NHCOCH₃ | —C₂H₅ | Red |
| 235 | —(CH₂)₃OCH₃ | 2,2,4—tri—CH₃—7—NHCOCH₃ | —CH₂CH₂OOCC₆H₅ | Red |
| 236 | —C₂H₅ | 2,2,4—tri—CH₃—7—NHCOCH₃ | —CH₂CH₂NCOCH₂CH₂CO | Red |
| 237 | —C₂H₅ | 2,2,4,7—tetra—CH₃ | —C₂H₅ | Scarlet |
| 238 | —C₂H₅ | 2,2,4,7—tetra—CH₃ | —CH₂CH₂CONH₂ | Scarlet |
| 239 | —C₂H₅ | 2,2,4,7—tetra—CH₃ | —CH₂CH₂CN | Scarlet |
| 240 | —C₂H₅ | 2,2,4,7—tetra—CH₃ | —CH₂CH₂NCOCH₂CH₂CO | Scarlet |
| 241 | —C₂H₅ | 2,2,4,7—tetra—CH₃ | —(CH₂)₃NHCOCH₃ | Scarlet |
| 242 | —C₂H₅ | 2,2,4,7—tetra—CH₃ | —CH₂CH₂OH | Scarlet |
| 243 | —C₂H₅ | 2,7—di—CH₃ | —CH₂CH₂CONH₂ | Scarlet |
| 244 | —C₂H₅ | 2,7—di—CH₃ | —CH₂CH₂NHCOCH₃ | Scarlet |
| 245 | —C₂H₅ | 2,2,4,7—tetra—CH₃ | —CH₂CH₂OOCCH₃ | Scarlet |
| 246 | —C₂H₅ | 2,2,4—tri—CH₃—7—NHCOCH₃ | —CH₂CH₂OOCCH₃ | Red |
| 247 | —C₂H₅ | 2,2,4—tri—CH₃—7—NHCOCH₃ | —C₂H₅ | Red |
| 248 | —C₂H₅ | 2,2,4—tri—CH₃—7—NHCOCH₃ | —CH₂CH₂CN | Red |
| 249 | —C₂H₅ | 2,2,4—tri—CH₃—7—NHCOCH₃ | —CH₂C₆H₅ | Red |
| 250 | —C₂H₅ | 2,2,4—tri—CH₃—7—NHCOCH₃ | —CH₂C₆H₁₁ | Red |
| 251 | —C₂H₅ | 2,2,4—tri—CH₃—7—NHCOCH₃ | —CH₂CH₂C₆H₅ | Red |
| 252 | —C₂H₅ | 2,2,4—tri—CH₃—7—NHCOCH₃ | —CH₂CH(OH)CH₃ | Red |
| 253 | —C₂H₅ | 2,2,4—tri—CH₃—7—NHCOCH₃ | —CH₂CH₂N(CH₃)SO₂CH₃ | Red |
| 254 | —C₂H₅ | 2,2,4—tri—CH₃—7—NHCOCH₃ | —CH₂CH₂OC₂H₅ | Red |
| 255 | —C₂H₅ | 2,2,4—tri—CH₃—7—NHCOCH₃ | —(CH₂)₃NHCONHC₂H₅ | Red |
| 256 | —C₂H₅ | 2,2,4—tri—CH₃—5,8—di—OCH₃ | —CH₂CH₂OH | Red |
| 257 | —C₂H₅ | 2,2,4—tri—CH₃—5,8—di—CH₃ | —C₂H₅ | Red |
| 258 | —C₂H₅ | 2,2,4—tri—CH₃—5—OCH₃—8—CH₃ | —C₂H₅ | Red |
| 259 | —CH₂CH₂CONH₂ | 2,2,4—tri—CH₃—7—NHCOCH₃ | —C₂H₅ | Red |
| 260 | —(CH₂)₃OCH₃ | 2,2,4—tri—CH₃—7—NHCOCH₃ | —C₂H₅ | Red |
| 261 | —C₆H₁₁ | 2,2,4—tri—CH₃—7—NHCOCH₃ | —CH₂CH₂OOCCH₃ | Red |
| 262 | —CH₂C₆H₅ | 2,2,4—tri—CH₃—7—NHCOCH₃ | —CH₂CH₂OOCOC₂H₅ | Red |
| 263 | —C₂H₅ | 2,2,4—tri—CH₃—7—NHCOCH₃ | —CH₂CH₂OOCC₂H₅ | Red |
| 264 | —CH₂CH₂OH | 2,2,4—tri—CH₃—7—NHCOCH₃ | —CH₂CH₂OOCCH₃ | Red |
| 265 | —CH₂CH₂NHCOCH₃ | 2,2,4—tri—CH₃—7—NHCOCH₃ | —CH₂CH₂OOCCH₃ | Red |
| 266 | —CH₂CH₂OOCCH₃ | 2,2,4—tri—CH₃—7—NHCOCH₃ | —CH₂CH₂OOCCH₃ | Red |
| 267 | —C₂H₅ | 2,2,4—tri—CH₃—7—NHCOC₆H₅ | —C₂H₅ | Red |
| 268 | —C₂H₅ | 2,2,4—tri—CH₃—7—NHCOOC₂H₅ | —C₂H₅ | Red |
| 269 | —C₂H₅ | 2,2,4—tri—CH₃—7—NHCOC₆H₅ | —C₂H₅ | Red |
| 270 | —C₂H₅ | 2,2,4—tri—CH₃—7—NHCOCH₂OC₆H₅ | —C₂H₅ | Red |
| 271 | —C₂H₅ | 2—CH(CH₃)₂—7—NHCOCH₂C₆H₅ | —C₂H₅ | Red |
| 272 | —C₂H₅ | 2—CH(CH₃)₂—7—NHCOCH₂OH | —C₂H₅ | Red |
| 273 | —C₂H₅ | 2—CH(CH₃)₂—7—NHCOCH₂OOCCH₃ | —C₂H₅ | Red |
| 274 | —C₂H₅ | 2—CH(CH₃)₂—7—NHCOCH₂Cl | —C₂H₅ | Red |
| 275 | H | 2,2,4—tri—CH₃—7—NHCOCH₃ | —C₂H₅ | Red |

TABLE III

| Example No. | R¹ | R²,R⁷ | R⁴ | Color |
|---|---|---|---|---|
| 12 | —C₂H₅ | 3,6—di—CH₃ | —CH₂CH₂OH | Scarlet |
| 276 | —C₂H₅ | 3,6—di—CH₃ | —CH₂CH₂CONH₂ | Scarlet |
| 277 | —C₂H₅ | 3,6—di—CH₃ | —(CH₂)₃NHCOCH₃ | Scarlet |
| 278 | —C₂H₅ | 3—CH₃—6—NHCOCH₃ | —C₂H₅ | Red |
| 279 | —C₂H₅ | 3,6—di—CH₃ | —(CH₂)₃NHCONHC₂H₅ | Scarlet |
| 280 | —C₂H₅ | 2,6—di—CH₃ | —CH₂—CH₂Cl | Scarlet |
| 281 | —CH₂CH₂OCH₃ | 2,6—di—CH₃ | —(CH₂)₃NHCOCH₃ | Scarlet |
| 282 | —CH₂CH₂OCH₃ | 2,6—di—CH₃ | —CH₂CH₂CONH₂ | Scarlet |
| 283 | —C₂H₅ | 2,6—di—CH₃ | —CH₂CH₂SC=NNHCH=N | Scarlet |
| 284 | —C₂H₅ | 2,6—di—CH₃ | —C₂H₅ | Scarlet |
| 285 | —C₂H₅ | 3,6—di—CH₃ | —CH₂CH₂CN | Scarlet |
| 286 | —CH₂CH₂OH | 3,6—di—CH₃ | —C₂H₅ | Scarlet |
| 287 | —CH₂CH₂N(CH₂)₃CO | 3,6—di—CH₃ | —CH₂CH₂CONH₂ | Scarlet |
| 288 | —CH₂CH₂CONH₂ | 3,6—di—CH₃ | —C₂H₅ | Scarlet |
| 289 | —CH₂CH₂CH₃ | 3,6—di—CH₃ | —CH₂CH₂NHCOCH₃ | Scarlet |
| 290 | —C₆H₁₁ | 3,6—di—CH₃ | —CH₂CH₂OH | Scarlet |
| 291 | —CH₂C₆H₅ | 3,6—di—CH₃ | —CH₂CH(OH)CH₃ | Scarlet |
| 292 | —(CH₂)₃CH₃ | 3—CH₃ | —CH₂CH₂CONH₂ | Scarlet |
| 293 | —(CH₂)₃CH₃ | 3—CH₃—6—Cl | —C₂H₅ | Scarlet |
| 294 | —(CH₂)₃CH₃ | 3—CH₃—5,8—di—OCH₃ | —CH₂CH₂OH | RED |
| 295 | —(CH₂)₃CH₃ | 3—CH₃—5,8—di—CH₃ | —CH₂CH₂CN | Scarlet |
| 296 | —C₂H₅ | 3,6—di—CH₃ | —C₂H₅ | Scarlet |
| 297 | —C₂H₅ | 3,6—di—CH₃ | —CH₂CH₂CONH₂ | Scarlet |
| 298 | —C₂H₅ | 3,6—di—CH₃ | —CH₂CH₂CN | Scarlet |
| 299 | —C₂H₅ | 3,6—di—CH₃ | —CH₂CH₂NCOCH₂CH₂CO | Scarlet |
| 300 | —C₂H₅ | 3,6—di—CH₃ | —(CH₂)₃NHCOCH₃ | Scarlet |
| 301 | —C₂H₅ | 3,6—di—CH₃ | —CH₂CH₂OH | Scarlet |
| 302 | —C₂H₅ | 3,6—di—CH₃ | —CH₂CH(OH)CH₃ | Scarlet |
| 303 | —C₂H₅ | 3,6—di—CH₃ | —CH₂CH₂N(CH₃)SO₂CH₃ | Scarlet |
| 304 | —C₂H₅ | 3,6—di—CH₃ | —CH₂CH₂OC₂H₅ | Scarlet |
| 305 | —CH₂CH₂CONH₂ | 3,6—di—CH₃ | —C₂H₅ | Scarlet |
| 306 | —(CH₂)₃OCH₃ | 3,6—di—CH₃ | —C₂H₅ | Scarlet |
| 307 | —C₆H₁₁ | 3,6—di—CH₃ | —CH₂CH₂OOCCH₃ | Scarlet |
| 308 | —CH₂C₆H₅ | 3,6—di—CH₃ | —CH₂CH₂OOCOC₂H₅ | Scarlet |
| 309 | —C₂H₅ | 3,6—di—CH₃ | —CH₂CH₂OOCC₂H₅ | Scarlet |
| 310 | —CH₂CH₂OH | 3,6—di—CH₃ | —CH₂CH₂OOCCH₃ | Scarlet |
| 311 | —CH₂CH₂NHCOCH₃ | 3,6—di—CH₃ | —CH₂CH₂OOCCH₃ | Scarlet |
| 312 | —CH₂CH₂OOCCH₃ | 3,6—di—CH₃ | —CH₂CH₂OOCCH₃ | Scarlet |

The compounds of the invention can be applied to polyester and cellulose acetate fibers by known disperse dyeing techniques employing carriers, surfactants, dispersing agents, etc. Dyeing can be conducted at atmospheric or superatmospheric pressures. The following example illustrates a dyeing procedure for applying the azo compounds of the invention to dye polyester textile materials at atmospheric pressure and at the boil:

Example 313

The azo compound of Example 1 (0.1 g) is dissolved in 10 cc. of 2-methoxyethanol. A small amount (3 to 5 cc.) of a three percent sodium lignin sulfonate aqueous solution is added, with stirring, and then the volume of the bath is brought to 300 cc. of a chlorinated benzene emulsion carrier (Tanavol) is added to the bath and 10.0 g. of a textile fabric made of poly(ethylene terephthalate) fibers is placed in the bath and worked 10 min. without heat. The dyeing is carried out at the boil for 1 hr. The dyed fabric is removed from the dyebath and scoured for 20 min. at 80°C. in a solution containing 1 g./l. neutral soap and 1 g./l. sodium carbonate. The fabric is then rinsed, dried in an oven at 250°F. and heat set (for the removal of residual carrier) for 5-min. at 350°F. The fabric is dyed a bright scarlet shade and exhibits excellent fastness properties when tested according to conventional methods such as those described in the Technical Manual of the American Association of Textile Chemists and Colorists, 1968 edition.

The following example describes a method by which our compounds can be applied to texturized polyester fibers:

Example 314

The azo compound of Example 10 (66.7 mg.) is dissolved/dispersed in 10 cc. of 2-methyoxyethanol in a Launder-Ometer container to which is then added with stirring about 0.2 g. sodium lignin sulfonate and 0.2 g. of a surfactant (Igepon T-51 ) from a stock solution containing both components. The volume of the bath is brought to 300 ml. with water and 0.3 g. of a butyl benzoate emulsion carrier (DAC-888) is added. A fabric (10 g.) of texturized poly(ethylene terephthalate) fibers is wet out and placed in the bath which is then sealed and affixed to the rotating arm of a Launder-Ometer set at 120°F. After placing the container-bath in rotation the Launder-Ometer is set at 260°F. and after the heating medium reaches that temperature, dyeing with rotation is continued for 1½ hours. After allowing the container-bath to cool, the dyed fabric is removed, rinsed with water and dried. If necessary, residual carrier can be removed by heat setting as described in the preceding example.

The compounds of the invention can also be applied to polyester textile materials by the heat fixation technique described in U.S. Pat. No. 2,663,612 and in the American Dyestuff Reporter, 42, 1 (1953). The following procedure describes how the azo compounds of the invention can be applied to polyester materials by the heat fixation technique:

Example 315

A mixture of 500 mg. of the compound of Example 4, 150 mg. of a sodium lignosulfonate dispersing agent (Marasperse N), 150 mg. of a partially desulfonated sodium lignosulfonate (Marasperse CB), 0.5 ml. glycerin, and 1.0 ml. of water is ground in a micro-size container (an accessory for a 1-quart size Szegvari Attritor) for approximately 3.5 hrs. Enough ⅛-inch stainless steel balls are added to provide maximum grinding. When the grinding is complete, the entire contents are poured into a beaker and 100 ml. of water are used to wash the remaining dye paste from the micro-container. The dye paste is then heated slowly to 65°C. with continuous stirring. A thickener and penetrating mixture is prepared by mixing 1 ml. of a complex diaryl sulfonate surfactant (Compound 8-S), 3 ml. of a 3 percent solution of a sodium N-methyl-N-oleoyltaurate (Igepon T-S1), 8 ml. of a 25 percent solution of natural gums (Superclear 80N), and sufficient water to bring the volume to 100 ml. The thickener and penetrating mixture is added to the dye paste, the volume is adjusted to 200 ml. and the mixture is agitated for 15 min. The dye mixture is then filtered through cheesecloth to remove the stainless steel balls and added to the reservoir of a Butterworth padder where it is heated to about 45° to 60°C. 10 G. of a fabric of poly(ethylene terephthalate) fibers and 10 g. of a fabric of 65/35 spun poly(ethylene terephthalate)/cotton fibers are sewn together, end-to-end, and padded for 5 min. of continuous cycling through the dye mixture and between three rubber squeeze rollers of the padder. Dye mixture pick-up is about 60 percent based on the weight of the fabrics. The padded fabrics are dried at 200°F. and then heat-fixed for 2 min. at 415°F. in a forced air oven. The dyed fabrics are scoured for 20 min. at 65°to 70°C. in a solution containing 0.2 percent sodium hydrosulfite, 0.2 percent sodium carbonate and 1.7 percent of a 3 percent solution of sodium N-methyl-N-oleoyltaurate and then dried. The dyed fabrics possess excellent brightness and fastness to light and sublimation.

The heat fixation dyeing procedure described above can be varied by the substitution of other dispersing agents, surfactants, suspending agents, thickeners, etc. The temperature and time of the heat-fixation step can also be varied.

Fibers having a basis of a linear terephthalate polyester and sold under the trademarks "Kodel," "Dacron," "Fortrel," "Vycron" and "Terylene" are illustrative of the linear aromatic polyester textile materials that can be dyed with the novel azo compounds. Polyesters prepared from ethylene glycol and dimethylterephthalate and cyclohexanedimethanol and dimethylterephthalate are examples of such linear aromatic polyesters. Polyesters prepared from cyclohexanedimethanol and dimethylterephthalate are more particularly described in U.S. Pat. No. 2,901,466. Poly(ethylene terephthalate) polyester fibers are described, for example, in U.S. Pat. No. 2,465,319. The polymeric linear polyester materials disclosed in U.S. Pat. Nos. 2,945,010; 2,957,745 and 2,989,363, for example, can be dyed. The linear aromatic polyester materials specifically named have a melting point of at least 0.35 and preferably, about 0.6. The inherent viscosity of the poly(1,4-cyclohexylenedimethylene terephthalate) polymer is also at least 0.35. These inherent viscosities are measured at 25°C. using 0.25 g. polymer per 100 ml. of a solvent consisting of 60 percent phenol and 40 percent tetrachloroethane. The polyester fabrics, yarns, fibers and filaments that are dyed with the novel azo compounds can also contain minor amounts of other additives such as brighteners, pigments, delusterants, inhibitors, stabilizers, etc.

The invention has been described in detail with particular reference to preferred embodiments thereof, but it will be understood that variations and modifications can be effected within the spirit and scope of the invention.

We claim:

1. A disperse dye azo compound having the formula

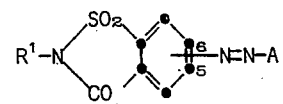

wherein

R$^1$ is hydrogen; lower alkyl; arylmethylene; cyclohexylmethylene; 2-cyanoethyl; 2-carbamoylethyl; aryl; cyclohexyl; or the group —Z—R$^{17}$ in which Z is ethylene, propylene, or trimethylene and R$^{17}$ is succinimido, glutarimido, phthalimido, hydroxy, lower alkanoyloxy, 2-pyrrolidinone, or lower alkoxy;

A is a group having the formula

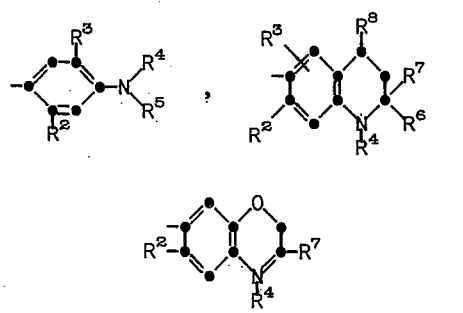

wherein:

R$^2$ is hydrogen, lower alkyl, lower alkoxy, chlorine, bromine or a group having the formula -NH-acyl;

R$^3$ is hydrogen, lower alkyl or lower alkoxy;

R$^4$ individually is alkyl containing one to eight carbon atoms; cyclohexyl; cyclohexyl substituted with lower alkyl; or lower alkyl substitued with lower alkoxy, aryl, aryloxy, cyclohexyl, cyano, lower alkanoyloxy, lower alkoxycarbonyl, lower alkoxycarbonyloxy, aroyloxy, lower alkylcarbamoyloxy, arylcarbamoyloxy, or a group having the formula

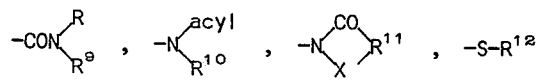

wherein

R individually is hydrogen, lower alkyl or aryl;

R$^9$ individually is hydrogen or lower alkyl;

R and R$^9$ collectively are —(CH$_2$)$_5$— or —CH$_2$CH$_2$OCH$_2$CH$_2$—;

R$^{10}$ is hydrogen, lower alkyl, aryl or cyclohexyl;

R$^{11}$ is ethylene, propylene, trimethylene, o-cyclohexylene, or o-arylene, or when X is —CO—, R$^{11}$ also can be —NHCH$_2$—, —N(lower alkyl)CH$_2$—, —SCH$_2$—, —OCH$_2$—, or —CH$_2$OCH$_2$—;

X is —CH$_2$—, —CO—, or —SO$_2$—; and

R$^{12}$ is aryl, benzyl, cyclohexyl, 1,2,4-triazol-3-yl, or 2-benzothiazolyl;

R⁵ individually is hydrogen; lower alkyl; lower alkyl substituted with lower alkoxy, aryl, aryloxy, cyclohexyl, lower alkanoyloxy, lower alkoxycarbonyl or lower alkoxycarbonyloxy; allyl; or aryl;

R⁴ and R⁵ in combination is a group having the formula —CH₂CH₂—Y—CH₂CH₂— in which Y is —CH₂—, —O—, —S—, —N(acyl)—, —SO— or —SO₂—;

R⁶ is methyl or, when R⁷ and R⁸ each is hydrogen, R₆ can be lower alkyl;

R⁷ and R⁸ each is hydrogen or methyl;

in which each aryl moiety is phenyl or phenyl substituted with lower alkyl, lower alkoxy, lower alkoxycarbonyl chlorine or bromine and each acyl is formyl; lower alkanoyl; lower alkanoyl substituted with chlorine, bromine, aryl, cyano, lower alkoxy, aryloxy, benzyloxy, lower alkylthio or lower alkylsulfonyl; aroyl; cyclohexoyl; lower alkoxycarbonyl; lower alkylsulfonyl; carbamoyl; lower alkylcarbamoyl; or furoyl;

and the 1,2-benzisothiazolon-1,1-dioxide group is bonded to the azo group at the 5- or 6-position.

2. A compound according to claim 1 having the formula

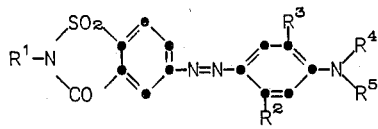

wherein
R¹ is lower alkyl; arylmethyl; arylmethylene; cyclohexylmethylene; 2-cyanoethyl; 2-carbamoylethyl; aryl; cyclohexyl; or the group —Z—R¹⁵ in which Z is ethylene, propylene, or trimethylene and R¹⁵ is succinimido, glutarimido, phthalimido, hydroxy, lower alkanoyloxy, 2-pyrrolidinone, or lower alkoxy;

R² is hydrogen, methyl, lower alkanoylamino, benzamido or lower alkoxycarbonylamino;

R³ is hydrogen or when R⁵ is hydrogen, R³ is methyl;

R⁴ is lower alkyl; allyl; cyclohexyl; arylmethylene; cyclohexylmethylene; 2-cyanoethyl; 2-carbamoylethyl; N-lower alkyl-2-carbamoylethyl; N,N-di-lower alkyl-2-carbamoylethyl; or the group —Z—R¹⁶ in which Z is ethylene, propylene or trimethylene and R¹⁶ is hydroxy, lower alkanoyloxy, lower alkoxycarbonyl, lower alkoxycarbonyloxy, succinimido, glutarimido, phthalimido, aroyloxy, lower alkoxy or the group

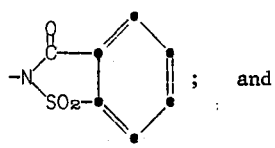

R⁵ is hydrogen; lower alkyl; cyclohexyl; arylmethylene; cyclohexylmethylene; or the group —Z—R¹⁷ in which Z is ethylene propylene or trimethylene and R¹⁷ is lower alkanoyloxy, lower alkoxycarbonyl, or lower alkoxycarbonyloxy.

3. A compound according to claim 1 having the formula

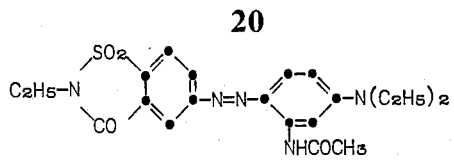

4. A compound according to claim 1 having the formula

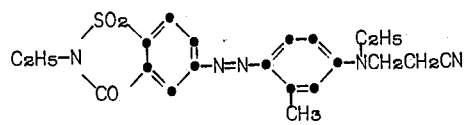

5. A compound according to claim 1 having the formula

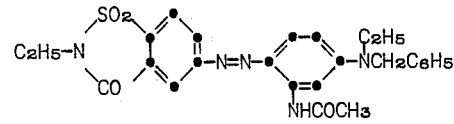

6. A compound according to claim 1 having the formula

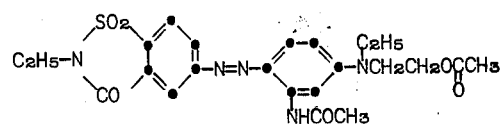

7. A compound according to claim 1 having the formula

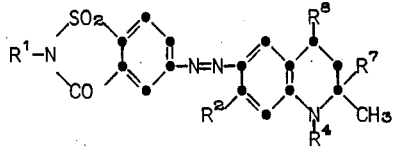

wherein
R¹ is lower arylmethylene; cyclohexylmethylene; 2-cyanoethyl; 2-carbamoylethyl; aryl; cyclohexyl; or the group —Z—R¹⁵ in which Z is ethylene, propylene, or trimethylene and R¹⁵ is succinimido, glutarimido, phthalimido, hydroxy, lower alkanoyloxy, 2-pyrrolidinone, or lower alkoxy;

R² is hydrogen, methyl, lower alkanoylamino, benzamido or lower alkoxycarbonylamino;

R⁴ is lower alkyl; allyl; cyclohexyl; arylmethylene; cyclohexylmethylene; 2-cyanoethyl; 2-carbamoylethyl; N-lower alkyl-2-carbamoylethyl; N,N-di-lower alkyl-2-carbamoylethyl; or the group —Z—R¹⁶ in which Z is ethylene, propylene or trimethylene and R¹⁶ is hydroxy, lower alkanoyloxy, lower alkoxycarbonyl, lower alkoxycarbonyloxy, succinimido, glutarimido, phthalimido, aroyloxy, lower alkoxy or the group

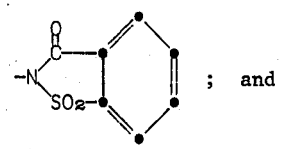
; and
R⁷ and R⁸ each is hydrogen or methyl.
8. A compound according to claim 1 having the formula
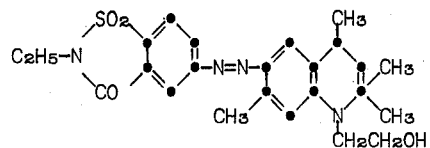
9. A compound according to claim 1 having the formula
10. A compound according to claim 1 having the formula
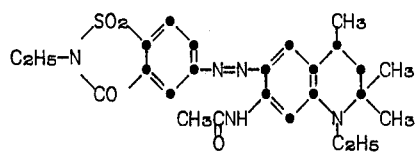
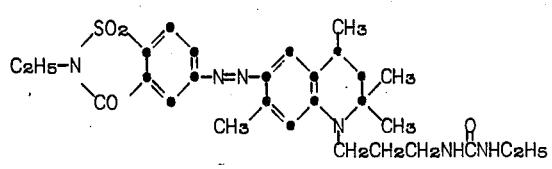
* * * * *

PO-1050
(5/69)

UNITED STATES PATENT OFFICE
CERTIFICATE OF CORRECTION

Patent No. 3,878,189    Dated April 15, 1975

Inventor(s) Clarence A. Coates, Jr., Max A. Weaver

It is certified that error appears in the above-identified patent and that said Letters Patent are hereby corrected as shown below:

Column 19, line 9, after "hydrogen," "$R_6$" should read ---$R^6$---.

Column 19, line 14, insert a semicolon (;) after the word "bromine".

Column 19, line 33, in the definition of $R^1$, delete "arylmethyl;".

Column 19, line 62, insert a comma (,) after the word "ethylene".

Column 20, line 50, in the definition of $R^1$, after "lower" insert ---alkyl;---.

Signed and Sealed this twenty-fifth Day of November 1975

[SEAL]

Attest:

RUTH C. MASON
Attesting Officer

C. MARSHALL DANN
Commissioner of Patents and Trademarks